United States Patent [19]

Meiri

[11] 4,104,006
[45] Aug. 1, 1978

[54] WIND-ENERGY CONVERSION DEVICE

[75] Inventor: Shmuel Meiri, Skokie, Ill.

[73] Assignee: Northwestern University, Evanston, Ill.

[21] Appl. No.: 758,086

[22] Filed: Jan. 10, 1977

[51] Int. Cl.² ............................................. F04B 17/02
[52] U.S. Cl. .......................................... 417/334; 416/80
[58] Field of Search ................... 417/334, 332; 290/44, 290/55; 416/79, 80; 92/137

[56] References Cited

U.S. PATENT DOCUMENTS

| 263,069 | 8/1882 | Smith | 416/79X |
|---|---|---|---|
| 804,257 | 11/1905 | McGregor | 416/80 |
| 917,464 | 4/1909 | Larson | 417/334 |
| 1,255,998 | 2/1918 | Fahle | 290/44 X |
| 1,447,455 | 3/1923 | Wold | 416/80 X |
| 2,285,823 | 6/1942 | McEntyre | 417/334 X |
| 2,465,285 | 3/1949 | Schwickerath | 416/80 X |

FOREIGN PATENT DOCUMENTS 1,120,816   4/1956   France ...................... 417/334

*Primary Examiner*—Carlton R. Croyle
*Assistant Examiner*—R. S. Gluck
*Attorney, Agent, or Firm*—Kegan, Kegan & Berkman

[57] ABSTRACT

A wind-powered device having a pair of flaps affixed to a rotatable axle which is coupled to a cable. The device is suitable for use in gusty winds prevailing at ground level, thereby obviating high towers required for conventional wind-energy conversion systems.

7 Claims, 5 Drawing Figures

U.S. Patent  Aug. 1, 1978  Sheet 1 of 2  4,104,006
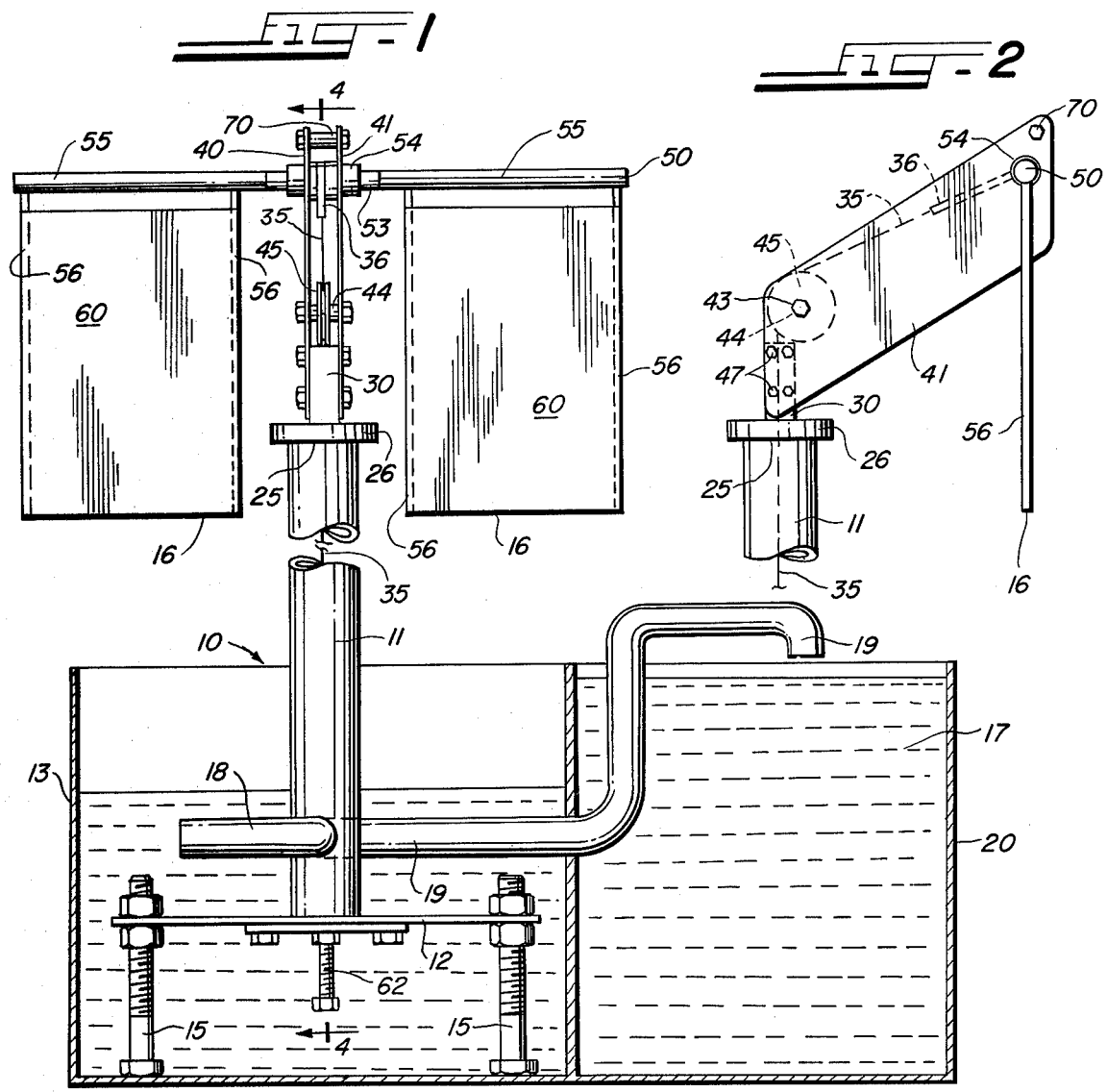
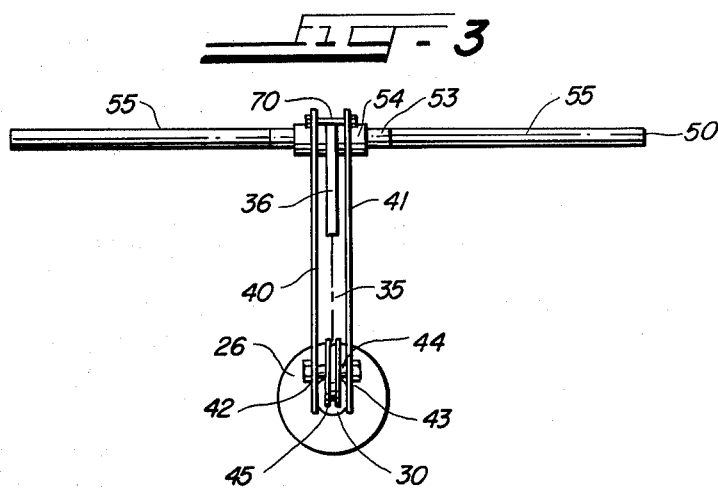

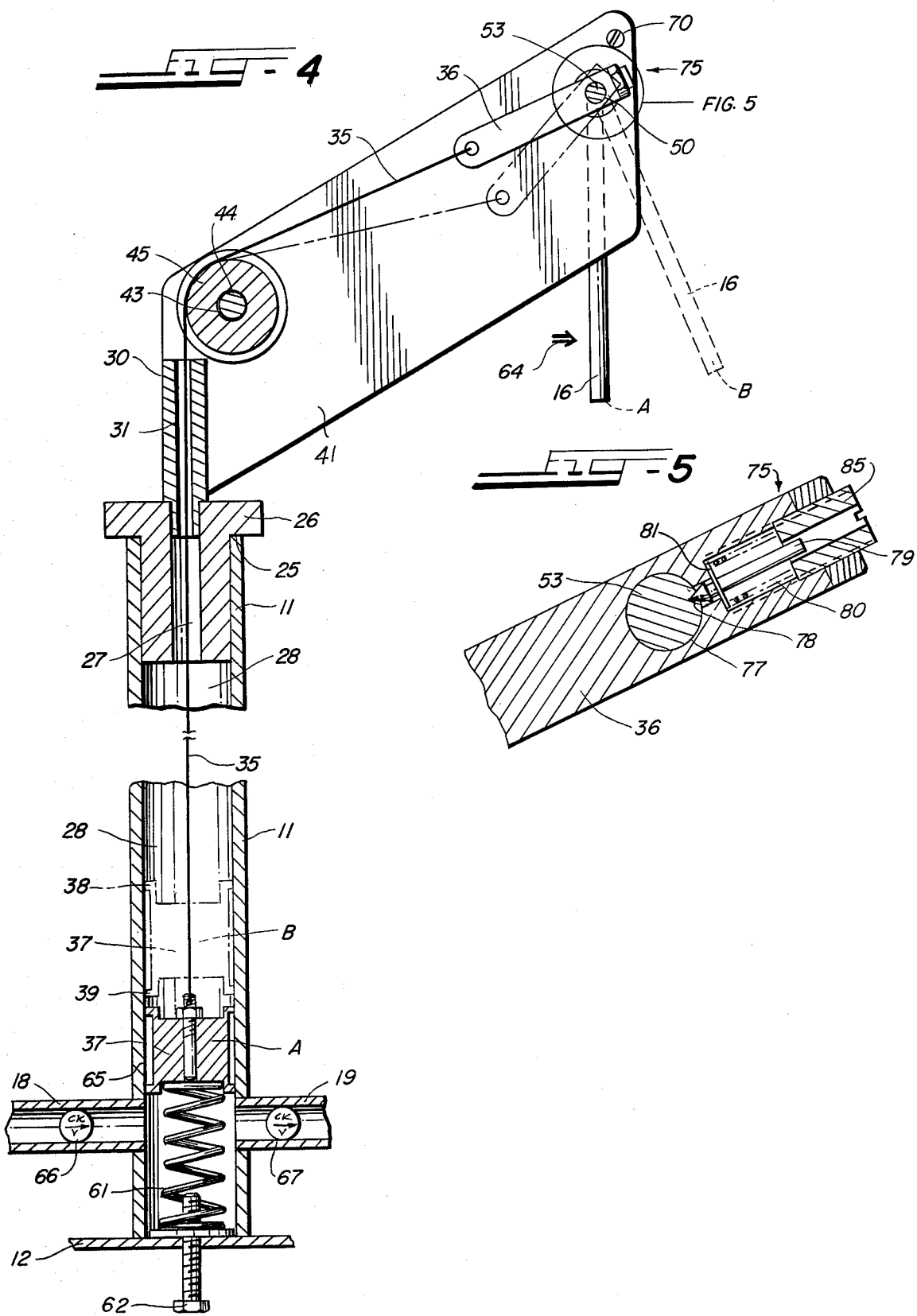

WIND-ENERGY CONVERSION DEVICE

BACKGROUND OF THE INVENTION

The present invention relates to the field of wind-powered devices. Unlike conventional windmills having a plurality of blades mounted on a rotatable wheel at an acute angle to the direction of prevailing wind, the present invention relies upon a pair of flaps extending normal to the prevailing wind direction. Wind pivots the flaps to rotate an axle having an attached, outwardly extending torque arm. The torque arm transmits reciprocal motion to a flexible wire cable.

It is a principal object of the present invention to provide a wind powered device which relies for its operation upon the tendency of winds to fluctuate in velocity and direction.

It is a related object of the invention to provide a wind-powered device which is operative under gusty wind conditions prevailing at ground level, thereby obviating any need for tall towers used to elevate conventional windmills.

A further object of the invention is to provide a wind-powered device which is simple and inexpensive in construction, having no conventional crankshaft or gears.

Another object of the invention is to provide a wind-powered device not requiring periodic lubrication or other routine maintenance.

Additional objects and advantages of the invention will be apparent to persons skilled in the art from the following detailed description taken in conjunction with the drawings.

BRIEF DESCRIPTIONS OF THE DRAWINGS

FIG. 1 is a fragmentary front elevational view of a wind-actuated device constructed in accordance with the teachings of the present invention, with associated water reservoirs being shown in cross-section;

FIG. 2 is a side elevational view of an upper portion of the pump of FIG. 1;

FIG. 3 is a top plan view of the portion of the pump shown in FIG. 2;

FIG. 4 is a cross-sectional view taken along the lines 4—4 of FIG. 1; and

FIG. 5 is a fragmentary cross-sectional view of a portion of the pump circled in FIG. 4.

DESCRIPTION OF A PREFERRED EMBODIMENT

A preferred embodiment of the wind-powered device of the invention is illustrated in FIG. 1. The device 10 includes a hollow vertical mast 11 firmly secured to a platform 12 contained within a first water reservoir 13. The platform 12 is held upwardly of a bottom 14 of the first reservoir 13 by several posts 15 anchored to the bottom 14. The mast 11 and platform 12 constitute, in combination, a support or support means for a pair of wind-sensitive flaps 16 held upwardly of the first reservoir 13. When gusts of wind strike the flaps 16, the device 10 moves water 17 through pipes 18, 19 from the first reservoir 13 to an adjacent second reservoir 20. Water retained in the second water reservoir 20 may be used for irrigating crops, powering turbines for generation of electricity, or other useful purposes.

Referring now more particularly to FIGS. 1-4, the mast 11 is a hollow metal tube having an upper face 25. A low-friction bearing 26 having a hollow core 27 is inserted within an upper portion of the mast 11, as shown in FIG. 4. The low-friction bearing is constructed from nylon combined with molybdenum disulfide. Other low-friction bearings, including Teflon (polytetrafluoroethylene) combined with molybdenum disulfide, may also be used. The hollow core 27 of the bearing 26 is coaxial with a corresponding opening 28 in the hollow mast 11. A rotatable hollow post 30 having a central opening 31 is inserted into the upper part of the bearing 26. This central opening 31 is coaxial with the central cavity 27 in the bearing 26 and with the opening 28 in the mast 11. The series of openings 31, 27, 28 provides a passageway for a flexible shaft means or shaft 35 interconnecting a torque arm 36 and a pump piston 37. The shaft 35 is a flexible 1/32 inch diameter steel wire cable in the embodiment shown. The shaft means may also be a chain, rope, or other strong, flexible material.

A pair of upwardly and laterally extending, spaced parallel plates 40, 41 are secured to the post 30. These plates are formed with opposed, laterally extending through openings 42, 43 through which a fixed rod 44 is inserted. This rod 44 centers a grooved circular pulley 45 for guiding the cable 35 through the passageway 31, 27, 28 in the support means. Two pairs of cross-rods 47 connect the plates 40, 41 to the post 30.

The two flaps 16 are affixed to a rotating axle 50 which extends through openings in the parallel plates 40, 41. A center portion of the axle 50 includes a ½-inch diameter solid stainless steel bar 53 covered by a pair of low-friction nylon bushings 54 adjacent the two openings. Hollow ½-inch diameter aluminum tubes 55 are connected to lateral ends of the steel bar 53 and extend laterally of both ends. The two flaps 16 are each framed by a pair of ¼-inch diameter aluminum tubes 56 affixed to the axle 50 and extend radially outwardly thereof in a single direction. These tubes 56 are bridged by sail cloths 60 comprising principal wind-gathering surfaces of the flaps 16.

A distal end of the flexible cable 35 is affixed to an upper part of the pump piston 37, as shown in FIG. 4. The pump piston 37 includes a pair of circular bearing rings 38, 39 abutting against an inner surface of a pump cylinder 65 to provide a water- and air-tight seal. A tension spring or spring means 61 is connected to a lower portion of the piston 37 to produce tension on the cable 35. Tension is adjusted by rotating a screw 62 threaded through the platform 12 and affixed to a lower end of the tension spring 61. Alternatively, the pump may be used to compress gas.

The mechanism of operation of the pump 10 of the invention is best understood with reference to FIGS. 1 and 4. The two parallel plates 40, 41 act as a vane or vane means maintaining principal surfaces 60 of the flaps 16 oriented generally normal to the prevailing wind direction indicated by an arrow 64 in FIG. 4. When there is no wind the flaps 16 and pump piston 37 are in their first or rest positions A. When a gust of wind strikes a principal surface 60, the flaps 16 are pivoted to a second, displaced position B leeward of the first position A. Leeward motion of the flaps 16 rotates a torque arm 36, thereby displacing the cable 35 and pump piston 37 upwardly to a second position B. Pressure is reduced in the pump cylinder 65 and water is drawn inwardly from the first reservoir and through a first check valve 66 in an intake pipe 18.

Upon relaxation of wind gusts, the tension spring 61 and gravity return both flaps 16 windwardly to their first, rest positions A. The spring 41 simultaneously pulls the pump piston 37 downwardly from its second position B to its rest position A, thereby increasing pressure in the pump cylinder 65 and driving water outwardly through a second check valve 67 in an exhaust pipe 19. Water is transmitted through this pipe 19 into a second water reservoir 20.

While the invention has been described with reference to variations in wind velocity between zero and a finite number, winds need not relax completely to operate the pump 10. It is necessary for winds to fluctuate in velocity, for example between 2 and 8 mph.

It has been calculated that when the flaps 16 are 6 by 8 feet in size and wind velocity varies between 2 and 8 mph, the device 10 will produce a 34-pound tension on the cable 35. This tension is sufficient to raise water an elevation of 25 feet when the bore of the pump cylinder 65 is 2 inches.

The device 10 of the invention is constructed to provide for possible exposure to extremely gusty winds with a velocity of 50 mph or greater. Under such conditions the flaps 16 may tend to pivot one or more complete revolutions about the axle 50, thereby coiling the cable 35 around the axle 50. In order to preclude such coiling and to maintain integrity of the apparatus, the mechanism is provided with a cross-bolt 70 and a releasable detent latch 75, illustrated in FIGS. 4 and 5.

The cross-bolt 70 is a solid metal rod extending across the lateral gap between the two parallel plates 40, 41. By limiting the extent of rotation of the torque arm 56, the cross-bolt 70 precludes coiling of the cable 35 on the axle 50. The cross-bolt 70 makes it impossible for the torque arm 36 to turn a complete revolution around the axle 50.

The detent latch 75 comprises a proximal end portion of the torque arm 36, and it permits free rotation of the axle 50 with respect to the torque arm 36 when motion of the arm 36 is limited by the cross-bolt 70 under extremely gusty wind conditions. The torque arm 36 defines a circular through opening 77 accommodating the steel bar 53. The bar 53 is formed with an outwardly facing notch 78 adjacent the torque arm 36. A point end portion of a pin 79 is resiliently urged into engagement with the notch 78 by a spring or elastic means 80 abutting against a flange 81 on the pin 79. A screw 85 contacting an end portion of the spring 80 provides means for adjusting tension against the pin 79.

When extremely gusty winds impose excessive torque on the axle 50, the pin 79 becomes disengaged from its notch 78. This allows the flaps 16 to pivot freely with the axle 50 even though the cross-bolt 70 limits rotation of the torque arm 36. Coiling of the cable 35 about the axle 50 is thus precluded, while maintaining structural integrity of the apparatus.

The foregoing description of the invention has been made with reference to only one preferred embodiment. Persons skilled in the art will understand that the invention described may be modified to provide power directly to compressors, vacuum pumps, and electrical generators as well as to water pumps. The invention may also be modified to convert shifts in wind direction to usable power by supporting the axle 50 in a vertical attitute rather than horizontally. Numerous such alterations and modifications may be made without departing from the spirit and scope of the invention as set forth in the following claims.

What is claimed is:

1. Apparatus for transducing gusts of wind into reciprocal motion, said apparatus comprising
   support means comprising a vertically extending mast,
   a rotatable axle supported by said mast,
   flap means affixed to said axle and including a principal surface extending radially outwardly thereof in a single direction, said flap means being pivotable leewardly with said axle in response to gusts of wind striking said principal surface,
   shaft means having a proximal end coupled to said axle and a distal end connected to tension-producing spring means, and
   coupling means intercoupling the proximal end of said shaft means to said axle and comprising an inflexible torque arm attached to said axle and extending radially outwardly thereof,
   whereby said shaft means is pulled proximally in response to gusts of wind displacing the principal surface of said flap means from a first, rest position to a second, displaced position; and said spring means pivots said flap means windwardly from a second, displaced position to a first, rest position in response to relaxation of wind gusts against said principal surface of the flap means;
   and wherein said apparatus further comprises
   vane means for maintaining the principal surface of said flap means generally normal to prevailing winds in a first rest position of said flap means, said vane means comprising a pair of parallel plates pivotally supported by said mast and extending radially outwardly thereof, and
   a cross-bolt extending horizontally between and adjoining said parallel plates radially outwardly of the mast, wherein said torque arm is adapted to abut against said cross-bolt in response to extremely strong gusts of wind directed against the principal surface of said flap means, whereby said cross-bolt limits pivotal rotation of said axle to preclude coiling of said flexible cable around said axle in extremely gusty winds.

2. The apparatus of claim 1, wherein said axle is formed with a radially outwardly extending notch adjacent said torque arm, and wherein said coupling means further comprises elastic means resiliently urging a proximal end portion of said torque arm into engagement in said notch.

3. The apparatus of claim 2, wherein said elastic means is adapted to release the proximal end portion of said torque arm from engagement with said notch upon application of torque to said axle by extremely gusty winds, thereby to preclude breakage of said coupling means and said torque arm.

4. The apparatus of claim 2, and further comprising
   a pump piston interposed between and interconnecting said spring means and a distal end of said shaft means, and
   a pump cylinder housing said pump piston.

5. The apparatus of claim 2, and further comprising a compressor piston interposed between and interconnecting said spring means and a distal end of said shaft means.

6. Apparatus for transducing gusts of wind into reciprocal motion, said apparatus comprising
   a vertically extending mast,
   a rotatable axle supported by said mast,
   flap means affixed to said axle and including a principal surface extending radially outwardly thereof in a single direction, said flap means being pivotable leewardly with said axle in response to gusts of wind striking said principal surface, shaft means having a proximal end coupled to said axle and a distal end connected to tension-producing spring means, coupling means comprising an inflexible torque arm intercoupling the proximal end of said shaft means to said axle and extending radially outwardly thereof, and a horizontally extending cross-bolt supported by said mast and situated radially outwardly thereof, whereby said shaft means is pulled proximally in response to gusts of wind displacing the principal surface of said flap means for a first, rest position to a second, displaced position; and said spring means pivots said flap means windwardly from a second, displaced position to a first, rest position in response to relaxation of wind gusts against said principal surface of the flap means, and wherein said axle is formed with a radially outwardly extending notch adjacent said torque arm, and said coupling means further comprises elastic means resiliently urging a proximal end portion of said torque arm into engagement in said notch.

7. The apparatus of claim 6, wherein said elastic means is adapted to release the proximal end portion of said torque arm from engagement with said notch upon application of torque to said axle by extremely gusty winds, thereby to preclude breakage of said coupling means and said torque arm.

* * * * *